Dec. 26, 1967 C. PICOU 3,360,797
ELECTROMAGNETIC TELEMETRIC STATION
Filed Oct. 19, 1966 5 Sheets-Sheet 1
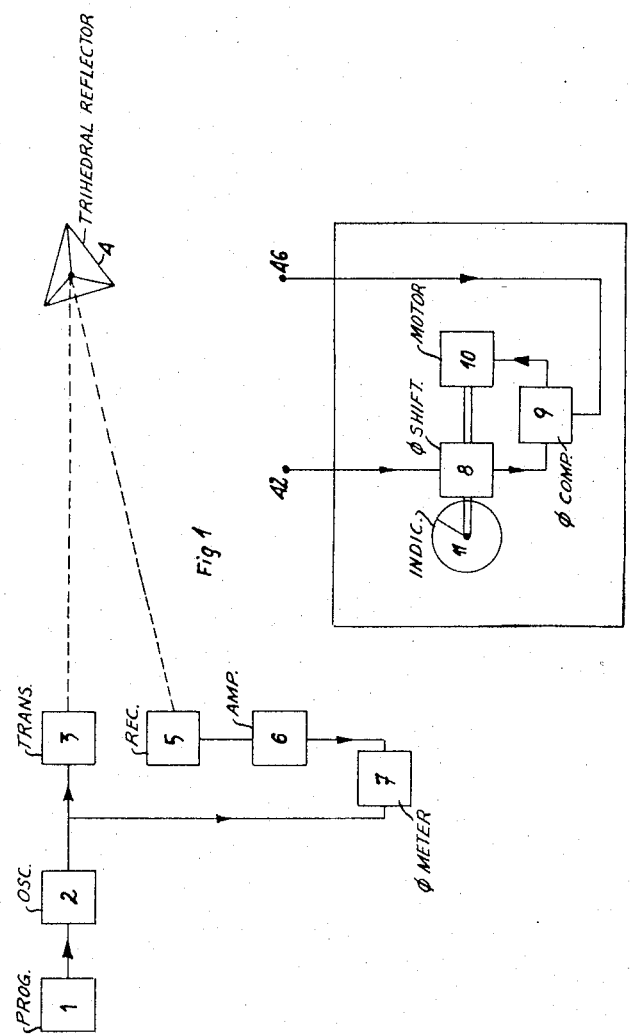

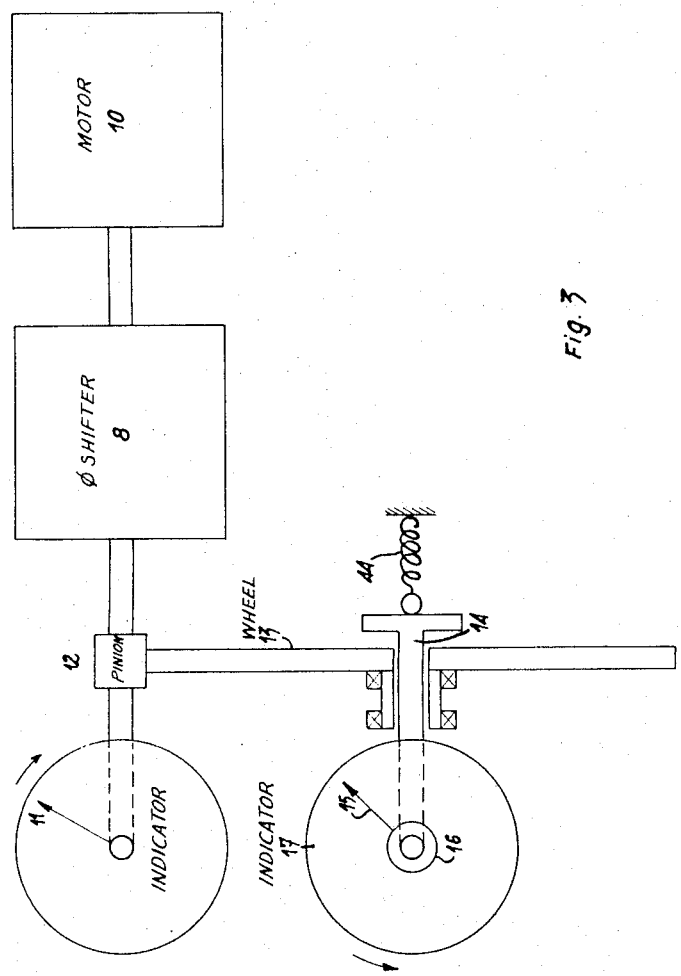

United States Patent Office 3,360,797
Patented Dec. 26, 1967

3,360,797
ELECTROMAGNETIC TELEMETRIC STATION
Claude Picou, Paris, France, assignor to Societe d'Etudes, Recherches & Constructions Electroniques (Sercel), Hauts-de-Seine, France, a corporation of France
Filed Oct. 19, 1966, Ser. No. 587,896
Claims priority, application France, Oct. 29, 1965, 36,639; May 21, 1966, 62,431
8 Claims. (Cl. 343—14)

ABSTRACT OF THE DISCLOSURE

Distance measuring system in which two oscillator signals are beat together and applied to a phase measuring system along with a reflected beat signal derived from one of the oscillators and a varying frequency signal, the reflected signal being further mixed with the varying frequency signal and then with the signal of the other oscillator, an amplifier with an automatic gain control being used between the receiver and phase measuring system.

It is a well-known fact that the distance between two points may be measured by the difference in phase produced by the time of travel of a modulated electromagnetic wave radiated by a transmitter located at a point at one end of the distance to be measured, reflected at the other end of said distance and collected by a receiver located in proximity to said transmitter.

As a matter of fact, the speed of electromagnetic waves is known with extreme accuracy and it is even possible to increase this accuracy by calculating their actual speed in air in a predetermined area and at a predetermined moment, starting from the value of said speed ascertained under normal conditions and corrected so as to take into account inter alia temperature, atmospheric pressure, rate of moisture and refractory index.

In order to obtain a sufficient accuracy, it is necessary to select for the modulating period a period which is much shorter than the duration of the to and fro travel and this leads to an ambiguity in the result obtained, since phase meters supply measurements which do not show the number of complete periods elapsed.

The type of modulation used is irrelevant as far as the present invention is concerned and may be a frequency, phase or amplitude modulation, provided the law of modulation is a sinusoidal function of time.

It will be implicitly assumed hereinafter that the modulation resorted to is an amplitude modulation, but a phase or frequency modulation may alternatively be applied German Patent 767,406, filed on Dec. 5, 1936 discloses a method according to which instead of measuring the phase difference between the transmitted wave and the received wave, the two waves are caused to produce beats with each other while the frequency of the wave produced is caused to vary between two predetermined limits at a rate slow enough for it to be possible to neglect the modification in frequency arising at the transmitter during the to and fro travel of the wave when comparing the phase of the reflected wave with that of the transmitted wave. The measurement of the distance is obtained in such a case by observing the number of zero beats during the time corresponding to a variation in the frequency value between said two predetermined limits. French Patent 1,402 of the Compagnie Générale de Géophysique proposes cutting out said ambiguity by resorting also to a variation in the frequency of modulation of the transmitted waves, said method leading to the use of rotary phasemeters executing one revolution per period wherein the total angle by which the phasemeter has rotated is ascertained, which angle includes an integral number of revolutions when the frequency of modulation rises from a lower value to a higher value.

It is apparent in fact that under such conditions the total variation of the difference in phase which is expressed by the formula $$\phi_2 - \phi_1 = (F_2 - F_1) \times \frac{4\eta R}{C}$$

is then known accurately that is including an integral number $k$ of periods, i.e. of revolutions of the phasemeter. In said formula $\phi_1$ designates the total difference in phase obtained for a frequency $F_1$, while $\phi_2$ designates the total difference in phase obtained for a frequency $F_2$, R designates the distance between the location of the transmitter and of the receiver and the wave-reflecting means and C the speed of electromagnetic waves with $\eta = 3.14$. This formula gives the distance R which is equal to $$R = \frac{C}{4\eta} \times \frac{\phi_2 - \phi_1}{F_2 - F_1}$$

Said value which shows no ambiguity forms a rough measurement of the distance, while a fine measurement is ensured by the reading given out by the phasemeter for the frequency $F_2$. In fact $$\phi_2 = F_2 \frac{4\eta R}{C}$$

but in this last formula, $\phi_2$ is ascertained only as to its fraction extending beyond an integral number $k$ of periods, so that the distance is given by said fine measurement is equal to $$R = \frac{C}{4\eta} \cdot \frac{\phi_2}{F_2} + k \frac{C}{2F_2}$$

or again since $$C/F_2$$

is equal to the wavelength $\lambda_2$ corresponding to the frequency $F_2$ $$R = \frac{\phi_2 \lambda_2}{4\eta} + k \frac{\lambda_2}{2}$$

Obviously, this latter measurement is all the more accurate when the wavelength $\lambda_2$ is shorter. For instance, if the phase is measured with an accuracy within 1.5 sexagesimal degrees, the possible error $\delta_R$ affecting the distance is equal to $$\delta_R = \pm \frac{1}{240} \frac{\lambda_2}{2}$$

If, for instance, $F_2$ is given a value equal to 15 megacycles, there is obtained $$\lambda_2 = 20 \text{ meters}$$

and $$\delta_R = \pm \frac{10}{240} \text{m.} = 0.04 \text{ m.}$$

The present invention has as an object the provision of various advantageous embodiments of the novel technique thus outlined.

The first method referred to will be first disclosed in a more definite manner, reference being made to FIGS. 1 and 2 of the accompanying drawings.

FIG. 1 is a general diagram of the arrangement used. A program defining system 1 produces a continuous modification between two predetermined limits $F_1$ and $F_2$ which are defined with a sufficient accuracy, of the frequency F of the oscillator 2 and the sinusoidal voltage at the output of said oscillator 2 serves for modulating a transmitter 3 of electromagnetic waves, said waves being constituted indifferently by luminous waves or by radio-electric waves. The wave radiated by the transmitter 3 located at one end of the distance to be measured reaches the other end of said distance where a trihedral 4 reflects said wave so that the latter is returned towards the transmitter and in collected by a receiver 5 located in proximity to the transmitter 3.

Said receiver 5 detects the voltage of the modulating frequency F which voltage is amplified at amplifier 6. The voltage fed by the amplifier 6 is compared with the voltage at the output of the oscillator 2 in the phasemeter 7, which phasemeter measures thus the phase shift produced in the modulating voltage by the duration of the travel from transmitter 3 to reflector 4 and back to receiver 5.

If luminous waves are used, it is possible to modulate the waves by means of a Kerr's cell or else to resort to a transmitter of luminous waves constituted by a laser such as a semi-conductive laser. It is also possible to use infrared rays obtained for instance by means of a semi-conductive diode producing infra-red rays.

FIG. 2 illustrates an advantageous embodiment of the phasemeter 7 incorporating a rotary phase shifter controlled by an auxiliary motor in accordance with a procedure which is well-known per se. It is connected at terminal 42 with the oscillator 2 and at terminal 46 with the amplifier 6. The voltage fed through the terminal 42 is phase shifted by a phase shifter 8 of the Selsyn type for instance and feeds one of the inputs of a phase comparator 9 the other input of which is connected at terminal 46 with the amplifier 6.

The output voltage of the phase comparator 9 controls a motor 10 to the shaft of which are keyed the rotary section of the phase shifter 8 and the indicator 11. It is readily apparent that when equilibrium is obtained, that is when the motor 10 is at a standstill, its shaft has rotated by an angle such that the phase shifter 8 provides a measurement of the difference in phase between the voltages supplied through 42 and through 46, the angular setting of the shaft of the motor 10 being given by the indicator 11.

In the embodiment described hereinabove, the operator is constrained to constantly look at the phasemeter throughout the time required for the frequency to vary between the value $F_1$ and the value $F_2$ so as to ascertain between the initial position of the indicator hand and its final position the number of revolutions executed by said hand during such a variation in frequency.

Now, according to a first feature of the present invention, this disadvantage is overcome by resorting to the use of a phasemeter associated no longer with a single indicator but with two indicators the speed of one of which is reduced with reference to that of the other by a speed reducing ratio such that in practice one may be sure that the hand of the second indicator moves over less than one complete revolution during said variation in frequency.

According to a further feature of the invention, the hand of the second indicator may be angularly shifted by hand, so that it may be returned to zero when the frequency of the modulating voltage is equal to one of the extreme values of the frequency range swept over, say the lower value $F_1$.

It is apparent that the variation in the value of the phase shift when the modulating voltage varies between the frequencies $F_1$ and $F_2$ is equal to the phase shift measured with a frequency of modulation equal to $F_2-F_1$ and consequently said phase shift is equal to that supplied by the frequency $F_2$ after dividing by the factor $$p=\frac{F_2}{F_2-F_1}$$

Obviously, under such conditions, the final position of the hand of the second indicator shows, when the sweep over the frequency range is at an end a phase difference which has to be multiplied by the product $pn$ of the factor $p$ by the above-mentioned speed ratio $n$ in order to obtain the value of the phase shift for the frequency $F_2$.

Said final position of the hand of the second indicator provides a rough measurement of the difference in phase without any ambiguity, with an error less than one revolution of the first indicator hand, while the accurate fine measurement is supplied without any reduction in speed by said first indicator hand.

In practice, the values for $n$ and $p$ are preferably selected so that $n=p=10$. The indicators carry scales of hundredths of a revolution and consequently if for instance the hand of the second indicator subjected to a speed reduction shows at the end of the period of frequency variations a value 63, while that of the first indicator which is not subjected to said reduction shows a value 26, the accurate measurement of the total phase shift for the terminal frequency $F_2$ is equal to 63, 26 phase revolutions.

Hereinafter it will be assumed that $p=n=10$ but obviously the invention is applicable also if values different from ten and from each other are used for $n$ and for $p$.

In the accompanying drawings, FIGS. 1 and 2 are explanatory diagrams.

FIGS. 3 to 5 illustrate various embodiments of the invention.

Figure 4:
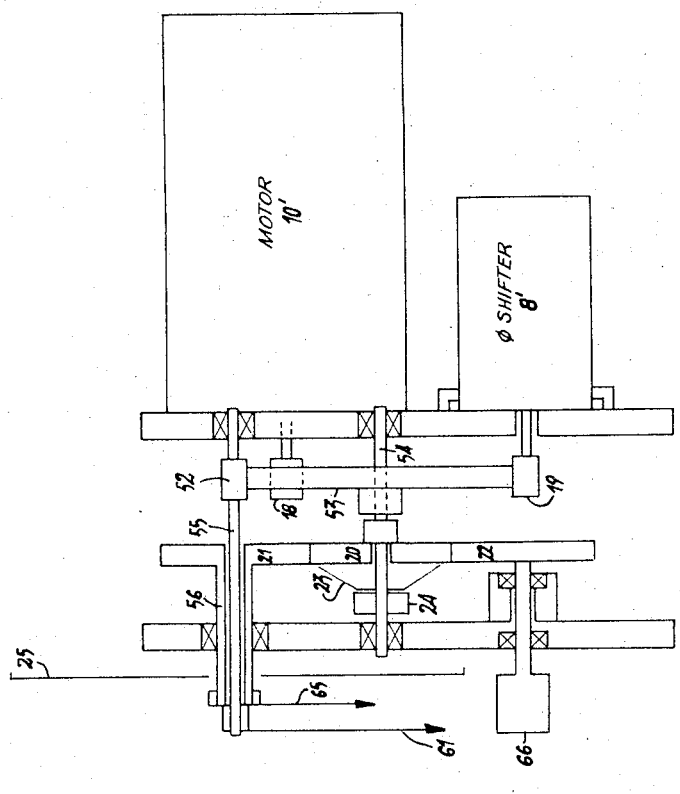

FIG. 3 illustrates a first embodiment of an indicator mechanism according to the invention. It shows again the motor 10 driving the phase-shift means 8 and the first indicator 11 which is not subjected to a reduction in speed. To the shaft common to said three last-mentioned parts, there is keyed furthermore a pinion 12 driving a wheel 13 rotating at a speed reduced with a ratio $n$ with reference to the common shaft, said ratio $n$ being equal for instance to 10. This wheel 13 drives frictionally a shaft 14 through a flange coaxially rigid with the latter. To said shaft 14 is keyed the hand 15 of a second indicator 17, the drive of the shaft 14 being insured by a spring 44 urging axially the flange terminating the shaft 14 against the transverse edge of the wheel 13. Said shaft 14 carries at its end facing the indicator a knurled knob 16. It is thus apparent that it is sufficient to depress said knob and to make it rotate when it is desired to disconnect the shaft 14 from the wheel 13 and to make the hand 15 turn manually. Such a disconnection is performed when the frequency of modulation has remained for a sufficient time at the starting value $F_1$. The hand 15 is then brought into registry with the zero of the scale on the indicator 17. When this adjustment has been made, the variation in frequency may be started.

FIG. 4 illustrates a modified embodiment wherein the two indicator hands 11 and 15 are arranged coaxially. Said embodiment includes as precedingly the motor 10' and the phase-shift means 8', but these parts 10' and 8' are no longer keyed to the same shaft and are mechanically interconnected by a gearing comprising a pinion 18 keyed to the shaft of the motor 10, a pinion 19 of the same diameter as the pinion 18, keyed to the shaft of the phase-shift means 8' and a toothed wheel 53 keyed to an intermediate shaft 54 and meshing simultaneously with the pinions 18 and 19 so as to make the latter rotate at the same speed.

The wheel 53 drives furthermore a pinion 52 keyed to a shaft 55 to which is secured the hand 61 of the indicator which is not subjected to a reduction in speed; said pinion 52 has the same diameter as the pinions 18 and 19. A toothed wheel 20 surrounding coaxially the intermediate shaft 54 is driven frictionally by the latter through the agency of a ring 24 keyed to the shaft 54 and engaging an elastic washer 23. Said wheel 20 meshes with a toothed wheel 21 coaxially rigid with a hollow shaft 56 surrounding coaxially the shaft 55. Said hollow shaft 56 drives the hand 65 of the indicator subjected to a reduction in speed, the speed reducing ratio between the pinion 18 and the shaft 56 subjected to a reduction in speed being equal to the ratio $n$ assumed to be equal to 10. Thus, the hollow shaft 56 executes in this case one tenth of a revolution for each complete revolution of the pinion 18.

The frictional drive of the toothed wheel 20 allows returning to zero the hand 65 of the second indicator before the frequency of modulation is caused to vary over the predetermined range of frequencies. There is provided to this end a knurled knob 66 keyed to a toothed wheel 22 meshing with the wheel 20 and adapted to drive the latter in spite of the friction exerted by the washer 23.

Element 25 is the single dial illustrated edgewise on which may be read the scale subdivisions registering with the hands 61 and 66 respectively.

The frictional driving torque of the wheel 20 by the shaft 54 should be sufficiently small for it to be impossible to carry along with it the shaft 54 when the hand 65 is being returned to zero, the resistant torque produced by the gears 18–19–52 being sufficient for preventing any such angular shifting of the shaft 54.

The invention has also for its object an improved embodiment of the electronic circuits which are to produce voltages the phase difference between which is to be measured.

As a matter of fact, the practical execution of the diagram illustrated in FIG. 1 meets serious difficulties ascribable in particular to the fact that the frequency of the modulating voltage varies or drifts to a substantial extent with reference to its mean value, said drift reaching a figure as high as 10% when $p$ is given as mentioned a value of equal to 10.

It is a well-known fact that the phase-shift produced by an amplifier is a function both of frequency and of local conditions such as temperature and consequently such variations in the value of the modulating frequency lead to unallowable errors as to the phase shift giving out the measured values.

Furthermore, the amplifier 6 illustrated in FIG. 1 should operate on a broad band of frequencies, the width of said band being equal for instance to 10% of the mean frequency when $p=10$. Consequently, such an amplifier is expensive and of a difficult execution and produces objectionable background noises which increase at the same rate as the width of the band. Lastly, the comparison between phases is performed on waves of a varying frequency which makes the operation a difficult matter.

According to a further embodiment of the invention, it is possible to remove these drawbacks by resorting to local oscillators and frequency mixers which allow amplifying the signals received and comparing phases of waves of an unvarying frequency.

To this end, it is preferable to use two local quartz stabilized oscillators carried inside a common chamber in a manner such that their drifts may compensate each other, said local oscillators supplying substantially unvarying frequencies the difference between which is equal to a very low substantially unvarying frequency, the phase difference being measured between voltages at said very low frequencies.

In order to define the magnitudes involved typical advantageous values are given hereinafter for the frequencies used.

The frequency of the modulating voltage varies between 13.5 and 15 megacycles during the sweep in frequency; the first local oscillator operates at a frequency of 4 megacycles and the second oscillator at a frequency of 4 megacycles plus 2,400 cycles so that the phasemeter operates on a frequency of 2,400 cycles.

Figure 5:
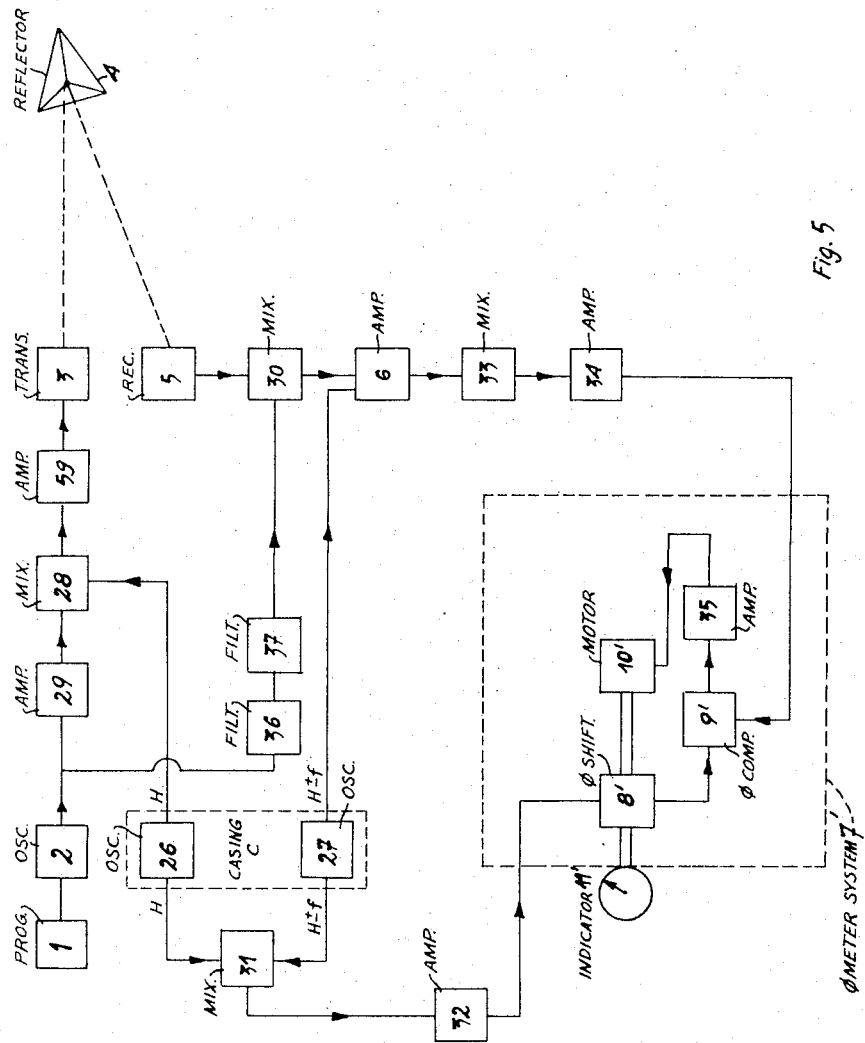

FIG. 5 illustrates diagrammatically the improved arrangement obtained. In said figure, element 26 is a first local oscillator operating at an unvarying frequency H equal for instance to 4 megacycles and element 27 is a second local oscillator operating at an unvarying frequency equal to $H-f$ or $H+f$, $f$ being a very low frequency, say 2,400 cycles, the phase-shift means operating on said very low frequency $f$. The oscillators 26 and 27 are preferably located inside a common chamber or casing C so as to be subjected to the same drift.

Element 2 designates the oscillator supplying a sinusoidal voltage of a variable frequency controlled by the voltage supplied by the program defining means 1. In the case illustrated, the frequency of the oscillator 2 varies no longer between $F_1$ and $F_2$ but between $F_1+H$ and $F_2+H$ or else between $F_1-H$ and $F_2-H$.

The output voltage of the oscillator 2 is amplified by the amplifier 29 acting furthermore as a buffer for preventing voltage appearing across its output terminals from returning to its input terminals.

Said amplifier 29 may in particular incorporate an electro-optical connection comprising a light-producing diode receiving the input signal and a receiving photodiode producing a voltage similar to that injected into the electro-optical connection. It is a well-known fact that such an arrangement is adapted to prevent the backward progression of parasitic voltages from the output towards the input.

The output voltages of the first local oscillator 26 and of the amplifier 29 feed a frequency changer or mixer 28 the output of which is the modulating voltage varying between the values $F_1$ and $F_2$.

Said modulating voltage is amplified at 59 beyond which it feeds the transmitter 3. The waves radiated by the latter impinge as noted above on the reflecting trihedral 4 returning said waves towards the receiver 5 adapted to receive the reflected signals.

The voltage at a frequency $F+H$ or $F-H$ according to the case appearing at the output of the oscillator 2 is fed through two filters 36 and 37 into one input of a second frequency changer 30 the other input of which receives the signals passing out of the receiver 5. There is thus obtained at the output of 30 a signal at an unvarying frequency H. The filter 36 functions to arrest all parasitic voltages the frequency of which is equal to F and which may arise in the mixer or frequency changer 28. Similarly, the filter 37 cuts out all possible parasitic voltages the frequency of which is equal to H and which may arise in said mixer 28.

The voltage of the second local oscillator 27 having a frequency $H+f$ or $H-f$ and those fed by the second frequency changer or mixer 30 and having a frequency H are amplified together in an amplifier 6' with a narrow bandpass. The angular phase shift to which said amplifier may subject the signals from oscillator 27 and from mixer 30 compensate one another. The output of the amplifier 6 feeds a further frequency changer or mixer 33 supplying across its output terminals a signal at a very low substantially unvarying frequency $f$.

Furthermore, the oscillations produced by the local oscillators 26 and 27 are fed to a mixer 31 the output of which supplies a voltage at a frequency $f$, which voltage is amplified at 32. Similarly, the voltage at the output of the frequency changer or mixer 33 is amplified at 34. The output signals at the same frequency $f$ of the amplifiers 32 and 34 are obviously phase shifted by an amount corresponding to the distance to be measured and are consequently fed into the system 7. Said system comprises, as noted above, a phase-shift means 8', a mixer or comparator 9', a motor 10' and an indicator 11'. There is incorporated therewith an amplifier 35 adapted to amplify the voltage of the comparator 9' before it is sent into the motor 10'. The system 7 ' is illustrated in conformity with FIG. 2, but obviously in practice the system to be used is preferably that illustrated in FIG. 3 or that illustrated in FIG. 4.

Thus, a system of amplifiers and frequency changers is incorporated with the receiver with a view to producing a signal at an unvarying low frequency, said signal being amplified so as to form one of the input signals for a phase comparing system the other input signal of which is obtained starting from the actual modulating voltage provided for the transmitter.

Now, the low frequency amplifier 34 of FIG. 5 amplifying the signals obtained through the reflected waves and inserted immediately ahead of the phase comparing system should operate on a comparatively broad band of frequencies. In fact, although said low frequency does not vary to any substantial extent, the mean frequency of said amplifier may drift during operation under the action for instance of modifications in temperature and of the ageing of the tubes or transistors used for said amplifier.

Therefore, if a selective amplifier were used, the latter would produce under the action of such drifts uncontrollable modifications in phase which would make the measurements obtained utterly unreliable.

Furthermore, it is essential for said low frequency amplifier to include an automatic gain control so that it may feed the phase comparing system with a signal of a substantially unvarying amplitude in spite of the variations in amplitude of the signal received. In the absence of such a gain control, the phase measurement obtained would depend to a varying extent on the amplitude of the signal thus applied to the phase comparator.

Lastly, it is a well-known fact that the background noise transmitted by an amplifier increases with the width of the band said amplifier can amplify.

Experience has shown that for the execution of a practically satisfactory arrangement the power of the stationary transmitter should be substantially limited, which results in that the reflected signal is very weak and in certain cases is less intense than the background noise. This does not prevent an accurate phase comparison since the phase comparator relies on the coherence of the signal, which property is not shared by the background noise.

In contradistinction, it is not possible under such conditions to obtain without any further difficulty an automatic gain control based on the level of signals applied to the input of the amplifier and constituted by the sum of the useful signal and of the background noise since if the useful signal is weaker than the background noise the automatic gain control would provide erratic and even completely erroneous results.

The present invention cuts out this difficulty and allows an accurate automatic gain control for the above-referred to amplifier adapted to operate on a broad band of frequencies, even in the case where the useful signal is weaker than the noise. This result is achieved by inserting in the loop of the automatic gain control a selective filter the band pass of which has its center in registry with the useful signal. Said result is allowed by the fact that the phase shifts arising in said loop are not objectionable since the voltage of the automatic gain control is a rectified voltage which has no relationship with the phase of the useful signal.

Consequently and in accordance with the invention the low frequency amplifier inserted in the receiver system disclosed is an amplifier with a broad band pass provided with an automatic gain control loop incorporating a filter separating the useful signal so as to allow obtaining starting from the latter the voltage for the automatic gain control.

Figure 6:
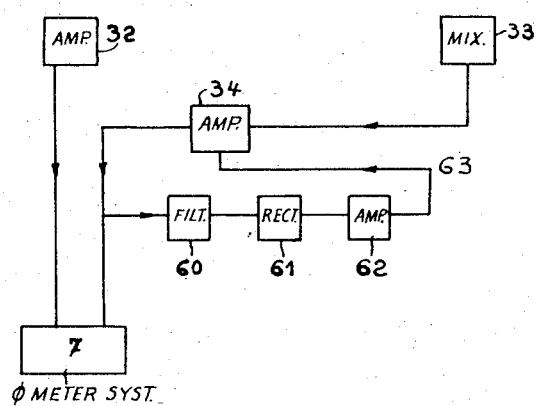
FIG. 6 shows a modified detail of FIG. 5.

The accompanying FIG. 6 is a diagram of a section of the receiver station of the type illustrated in FIG. 5 and incorporating the last-mentioned improvement. The same reference numbers are used as in said FIG. 5. Thus, 33 designates again the frequency changer or mixer the output of which supplies the signal at a low frequency $f$ and 34 designates the amplifier for said frequency changer 33. FIGURE 7 designates the phase-measuring system one of the inputs of which is fed by the amplifier 32 amplifying the voltage at a frequency $f$ obtained starting from the modulating voltage, while the other input of the phase measuring system is fed by the output of the amplifier 34.

Said amplifier 34 is a low frequency broad band amplifier providing a variable gain and associated with an automatic gain control. The latter is fed with the output voltage of the amplifier 34. Said voltage is filtered by a filter 60 with a narrow band the center of which registers with the low frequency signal voltage $f$. Said filter separates the signal from the background noise and its output voltage is rectified at 61 so as to supply the automatic gain-controlling voltage which may then be amplified at 62. The output of the amplifier 62 controls through the connection 63 the gain of the amplifier 34.

The different parts of the arrangements disclosed may be modified while remaining within the scope of the invention as defined in the accompanying claims.

What I claim is:

1. A system for measuring the distance of a reflective object comprising a signal source for generating a signal of varying frequency, first and second oscillators generating signals of frequencies H and $H+f$ respectively, a first mixer coupled to said source and said first oscillator, a transmitter coupled to said mixer and transmitting to said object a signal modulated by the beat signal generated in the mixer, a receiver for receiving signals reflected by said object, said receiver comprising a detector having an outlet supplying a signal of same frequency as said beat signal, a second mixer coupled to said source and receiver to beat the signals thereof, a third mixer to beat the signals of said oscillators, a fourth mixer coupled to said second oscillator and to said second mixer to beat the signals thereof, and a phase meter means to compare and indicate the phase shift between the signals of the third and fourth mixers.

2. A system as claimed in claim 1 comprising an amplifier including an automatic gain control loop between the fourth mixer and the phase meter means.

3. A system as claimed in claim 1 comprising parasitic filter means between said source and second mixer.

4. A system as claimed in claim 1 comprising a common casing encompassing said oscillators.

5. A system as claimed in claim 1 wherein said phase meter means comprises first and second indicator means, one of which indicates total integral numbers of phase shifts and the other of which indicates phase shift magnitudes between integral numbers of phase shifts.

6. A system as claimed in claim 1 wherein said phase meter means includes a phase shift means, a motor coupled to said phase shift means, and a phase comparator coupled to said phase shift means and controlling said motor.

7. A system as claimed in claim 2 wherein said amplifier is a low-frequency broad-band amplifier having a variable gain.

8. A system as claimed in claim 7 wherein said loop includes a band pass filter centered on frequency $f$, a rectifier coupled to the latter said filter, and an amplifier.

References Cited

UNITED STATES PATENTS

| | | | |
|---|---|---|---|
| 2,638,586 | 5/1953 | Guanella | 343—14 X |
| 2,705,320 | 3/1955 | Palmer | 343—12 X |
| 3,248,729 | 4/1966 | Howard et al. | 343—14 X |

RODNEY D. BENNETT, *Primary Examiner.*

J. P. MORRIS, *Assistant Examiner.*